April 18, 1939.  R. W. BRIGGS  2,154,970
GRUBBING IMPLEMENT
Filed May 21, 1938   2 Sheets-Sheet 1
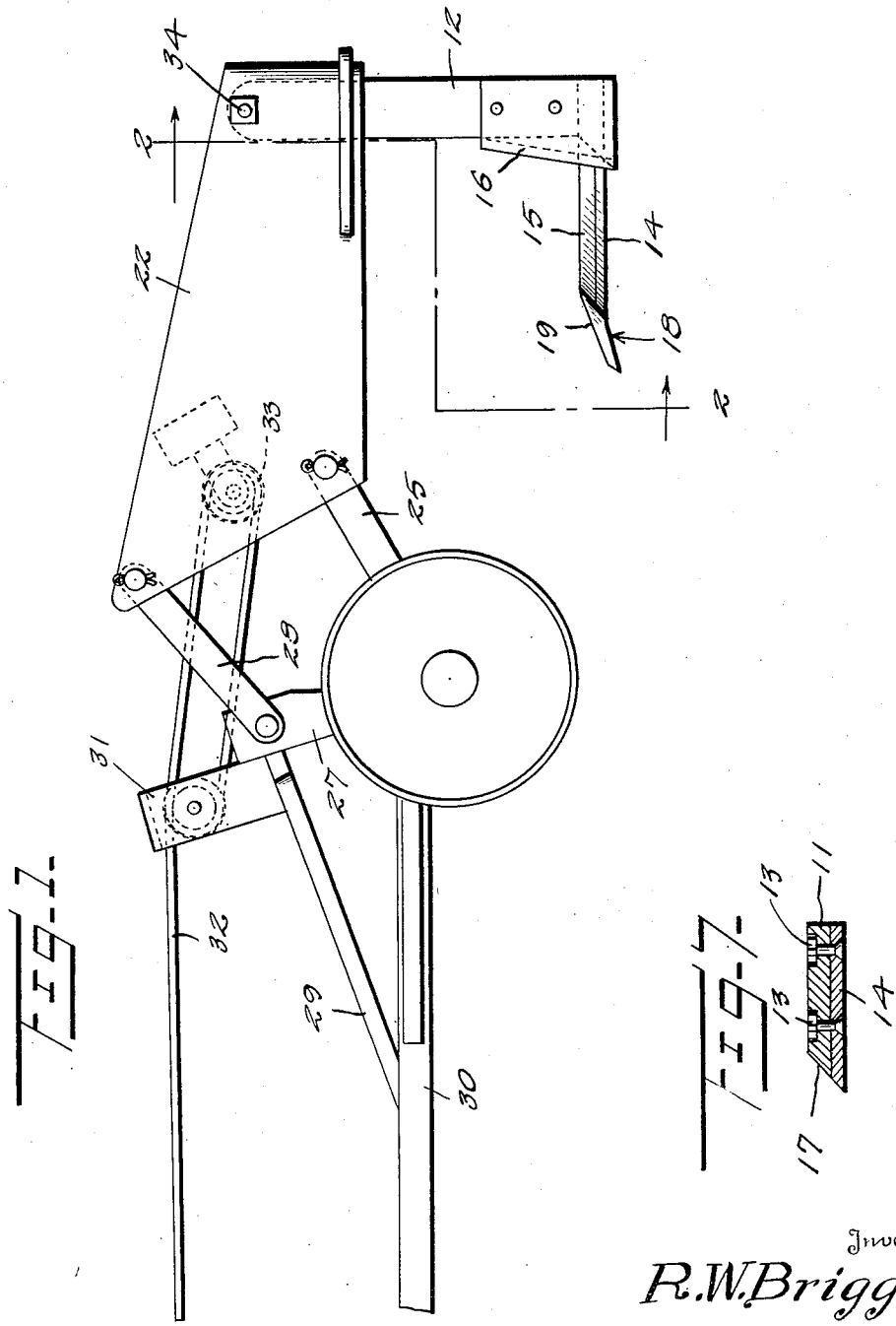
Inventor
R. W. Briggs
By Watson E. Coleman
Attorney April 18, 1939.    R. W. BRIGGS    2,154,970
GRUBBING IMPLEMENT
Filed May 21, 1938    2 Sheets-Sheet 2
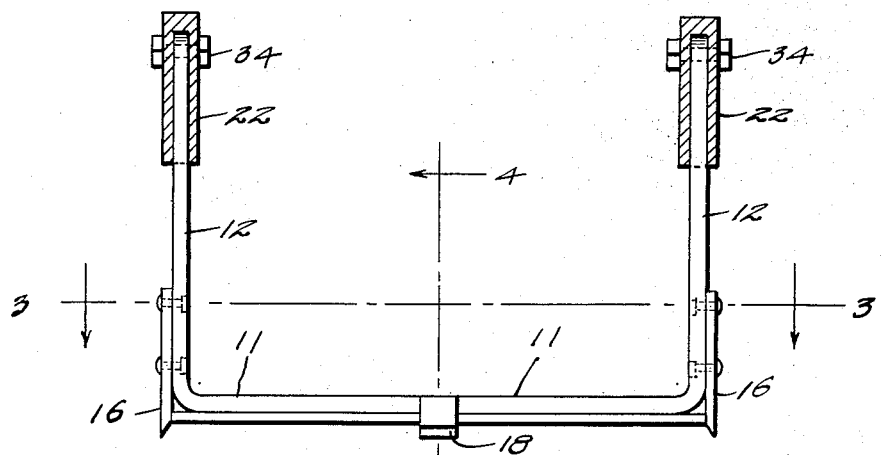
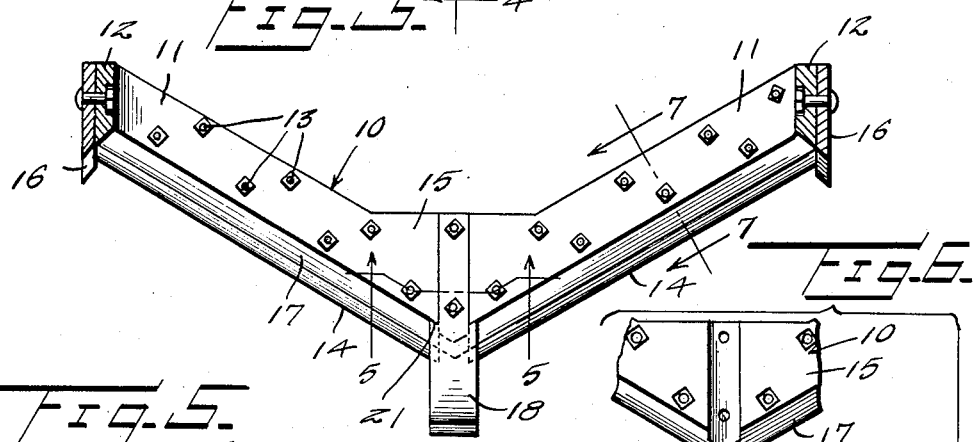
Inventor
R. W. Briggs
By Watson E. Coleman
Attorney Patented Apr. 18, 1939

2,154,970

UNITED STATES PATENT OFFICE 2,154,970

GRUBBING IMPLEMENT

Robert W. Briggs, Pharr, Tex.

Application May 21, 1938, Serial No. 209,338

8 Claims. (Cl. 97—226.1)

This invention relates to grubbing implements for the purpose of cutting underground roots, and the general object is to provide a tractor-drawn implement operating over a relatively large area transversely of the machine, which will rapidly and effectively cut the subsurface roots when land is to be cleared or cut down and kill low-growing brush and small undergrowth without disturbing the growth of grass, the surface soil simply flowing up and over the bit or grubbing implement like a ribbon, thus aerating the soil and cultivating the grass.

Another object is to provide an implement of this character having forwardly converging cutting blades and a downwardly inclined point or tooth at the junction of the blades which acts to hold the cutting blades beneath the grass or surface of the ground though the blades are cutting horizontally.

A further object is to provide means whereby the grubbing implement or bit, as it may be called, which is very heavy, may be readily attached to or removed from arms supporting the bit upon a carriage, the carriage having means whereby the arms supporting the bit may be raised or lowered into or out of operation.

My invention is illustrated in the accompanying drawings wherein:

Fig. 1 is a side elevation of a grubbing machine or implement constructed in accordance with my invention.

Fig. 2 is a section on the line 2—2 of Fig. 1.

Fig. 3 is a section on the line 3—3 of Fig. 2 on a slightly larger scale.

Fig. 4 is a section on the line 4—4 of Fig. 2.

Fig. 5 is a fragmentary section on the line 5—5 of Fig. 3.

Fig. 6 is a fragmentary top plan view of the beam, the cutting blades and the tooth separated from each other.

Fig. 7 is a section on the line 7—7 of Fig. 3.

My grubbing implement by itself essentially includes a transversely extending relatively heavy horizontally disposed cutting element having forwardly converging cutting edges and vertical legs or supporting members engaged with the blade at their lower ends, these supporting members being in turn mounted upon relatively heavy arms operatively pivoted upon the carriage so that the arms may be raised or lowered. In the drawings, 10 indicates generally a laterally disposed cutting implement and as shown, this implement includes a transverse beam 11 which may be made of metal, wood or other suitable strong, rigid and rather heavy material. This beam has attached to it or formed integrally with it the upstanding supports or legs 12. Countersunk bolts 13 are used for attaching to the underface of this transverse beam the removable cutting blades 14. It will be seen from the drawings that the beam 11 is angular in plan and relatively wide at its middle as at 15. The lateral portions of the beam 11 converge forwardly and thus the two cutting blades 14 converge forwardly. Side blades 16 are bolted to the outside faces of the two supporting legs 12, each side blade extending downward slightly below the underfaces of the blades 14 and having sharp lower edges and sharp forward edges. The beam 11 is beveled as regards its forward edge at 17. The beam 11 with the supporting legs constitute together a U-shaped yoke. The supporting legs 12 may be disposed either at the ends of the beam 11 or inward of these ends.

Disposed at the middle of the beam 11 is a point or tooth 18 which has a beveled upper face 19, and which is depressed at a slight downward angle relative to the underfaces of the blades 14. The point has upper and lower shanks 20 which extend rearwardly over the beam and are attached thereto in any suitable manner. The shanks are narrower than the point and the inner ends of the blade 14 extend into the space between the shanks and abut against the beveled shoulders 21 formed at the junction of the shanks with the body of tooth 18. The shanks may be welded or riveted to the beam 10 (if the latter is of metal) or bolted thereto. It will be noted that the blades are immovable and that the nuts of the bolts 13 are disposed in countersunk openings. The beam 10 and the supports 12 are relatively heavy particularly if formed of metal such as iron or steel.

As shown in Fig. 1 the upper ends of the supports 12 are inserted in recesses in a pair of relatively heavy longitudinally extending parallel vertical tiltable arms 22, the supporting legs being bolted to these arms. The heavy arms at their forward ends are pivotally mounted on a carriage for swinging movement in a vertical plane so that the yoke and the cutter blades carried thereby may be lowered into operative position or entirely raised from the ground.

I do not wish to be limited to any particular form of carriage or of lifting means but have shown a carriage which is adapted to be pulled by a tractor. This carriage, as illustrated, has a frame mounted upon two wheels 23 with a drop axle 24. Links 25 are pivoted at their upper ends to the lower forward corners of the arms 22 and to blocks 26 mounted on the drop axle. Also extending up from these blocks are arms 27 to which are pivoted links 28, these links in turn being pivoted to the forward upper corners of the heavy arms 22. These upwardly extending arms 27 are pivotally connected at their upper ends to a draft yoke 29 while the frame of the carriage is connected to a draft bar 30 whereby the carriage may be connected to a tractor. The draft yoke 29 carries upon it a sheave disposed within a casing 31. A cable 32 passes over this sheave and around a multiple sheave 33 in turn operatively connected to the arms. The arms are braced from each other in any suitable manner and they are intended to move as a unit. By pulling upon the cable 30, the links 25 and 28 will be shifted upon their pivots and the arms 22 will be raised or lowered. As before remarked, any other suitable means may be used for mounting these heavy arms 22 upon a carriage and raising or lowering these arms, the particular means shown for supporting and operating the arms not being any part of my invention.

The operation of the mechanism is obvious. When lowered, the weight of the arms 22 and of the yoke supporting blades, urges the blades downward flat against the ground and when the implement is drawn forward, the point or tooth 18 will act to force the cutting blades below the surface of the ground so that as the implement is drawn along, it will cut off the sub-soil roots. Obviously the point may have a greater or less angle relative to the blades and if this angle is very slight, the blades will be drawn horizontally along the surface of the ground without destroying the grass but will cut off small bushes, brush, etc., and thus clear the ground.

It is to be understood that the structure shown in Figs. 2 to 6 is very heavy and the arms 22, being also of metal, are heavy. The virtue of this tool lies particularly in the shape of the bit or cutting implement shown in plan view in Fig. 3, and in the fact that it will cut underground roots, trees and brush without killing the grass. In actual practice, it has been found that the surface soil flows up and over the bit like a ribbon so that the sod beneath which the bit or cutting implement passes simply rides over the implement and then is re-laid, as it were, on the surface of the ground. By this means, the grass gets a good cultivation, the soil gets aeration and is opened up so that it catches and preserves the moisture. It will be noted that the cutting implement has its legs 12 engaged with the arms 22 by means of transverse bolts or pins 34. These can be quickly removed so that the bit or cutting implement itself may be changed in a few minutes. Thus a tractor need not be tied up while the cutting blades are being removed and sharpened. In other words, by having surplus cutting blades and surplus implements such as shown in Figs. 2 to 6, the new implement with sharpened blades can be ready at all times to be exchanged with a minimum of lost time.

One of the particular advantages of this implement shown in Figs. 2 to 6, resides in the fact that the downwardly inclined point or tooth 18 acts to hold the tool in line when roots are encountered by one or the other of the inclined cutting edges, these roots thereby causing a side thrust. The end blades 16 have the same object and for this reason project slightly below the plane of the cutting edges. These side vertical blades 16 also serve to cut roots running horizontally and transversely of the line of movement of this implement so that by overlapping the machine on the return trip, the entire area of roots will be severed.

While I have illustrated a form of carriage which has been used in the same general way with other root cutting means, the carriage itself forms no part of my invention but this carriage with its original root cutting means was found to be ineffective without the root cutting means illustrated in the accompanying drawings.

While I have illustrated certain details of construction and a certain arrangement of parts, I do not wish to be limited thereto as these might be varied in many ways without departing from the spirit of the invention as defined in the appended claims.

What is claimed is:

1. A grubbing implement, including a transversely extending beam having upstanding supporting portions, the beam having its forward edge extending forward and convergently to the middle of the beam, the forward edge of the beam being beveled downward and forward, a tooth attached to said beam at the middle thereof and extending forwardly therefrom, said tooth being deflected downward towards its forward end, and a pair of cutting blades disposed one on each side of the tooth and extending parallel to the forward edge of the beam, the blades being disposed on the underface of the beam.

2. A grubbing implement, including a transversely extending beam having upstanding supporting portions, the beam having its forward edge extending forward and convergently to the middle of the beam, the forward edge of the beam being beveled downward and forward, a tooth attached to said beam at the middle thereof and extending forwardly therefrom, said tooth being deflected downward towards its forward end, and a pair of cutting blades disposed one on each side of the tooth and extending parallel to the forward edge of the beam, the blades being disposed on the underface of the beam, the inner ends of the blades extending inward behind the tooth.

3. A grubbing implement, including a transversely extending beam having upstanding supporting portions, the beam having its forward edge extending forward and convergently to the middle of the beam, the forward edge of the beam being beveled downward and forward, a tooth attached to said beam at the middle thereof and extending forwardly therefrom, said tooth being deflected downward towards its forward end, and a pair of cutting blades disposed one on each side of the tooth and extending parallel to the forward edge of the beam, the blades being disposed on the underface of the beam, the upright supporting members having cutting blades attached to their outer faces and extending forward and rearward, the blades being sharpened on their forward edges.

4. A grubbing implement, including a transversely extending beam having upstanding supporting portions, the beam having its forward edge extending forward and convergently to the middle of the beam, the forward edge of the beam being beveled downward and forward, a tooth attached to said beam at the middle thereof and extending forwardly therefrom, said tooth being deflected downward towards its forward end, and a pair of cutting blades disposed one on each side of the tooth and extending parallel to the forward edge of the beam, the blades being disposed on the underface of the beam, the upright supporting members having cutting blades attached to their outer faces and extending forward and rearward, the blades being sharpened on their forward edges, said lateral blades extending downward below the lower face of the first-named cutting blades and having each a cutting edge at its lower end.

5. A grubbing implement, including a transversely extending relatively heavy beam having upstanding relatively heavy supporting portions, the beam having its forward edge extending forward and convergently to the middle of the beam, means attached to the beam and adapted to engage the ground and draw the beam downwardly, and cutting blades attached to the beam on the underface thereof and extending parallel to the forward edge of the beam, the ends of the beam being provided with vertically disposed blades, said blades having forward cutting edges and lower cutting edges, the last-named cutting edges extending below the beam.

6. A grubbing implement, comprising a beam member having upstanding supporting end portions, a ground engaging tongue secured to and extending forwardly from said beam at the transverse center thereof, cutting blades attached to the beam at the sides of said tongue and extending parallel to the edge of the beam from which the tongue projects, and vertically disposed blades secured to said supporting portions, said blades having the forwardly directed and the bottom edges thereof sharpened to provide cutting edges.

7. A grubbing implement of the character described, comprising a flat beam having upstanding supporting portions at its ends by which it is adapted to be attached to a carrying structure, said beam being provided at its transverse center with a transverse slot in its upper face, a tongue member having a pair of spaced parallel flat shanks extending from one end, one of said shanks being adapted for sliding engagement in said slot with the adjacent portion of the beam disposed between the shanks, said tongue being formed to extend forwardly and downwardly from the beam when the shanks are in engagement therewith, a cutting blade attached to the underside of the beam at each side of the under one of said tongue shanks, and means detachably securing the blades and the tongue shanks to the beam.

8. A grubbing implement of the character described, comprising a flat beam having upstanding supporting portions at its ends by which it is adapted to be attached to a carrying structure, said beam being provided at its transverse center with a transverse slot in its upper face, a tongue member having a pair of spaced parallel flat shanks extending from one end, one of said shanks being adapted for sliding engagement in said slot with the adjacent portion of the beam disposed between the shanks, said tongue being formed to extend forwardly and downwardly from the beam when the shanks are in engagement therewith, a cutting blade attached to the underside of the beam at each side of the under one of said tongue shanks, means detachably securing the blades and the tongue shanks to the beam, and vertical cutting blades secured at the outer ends of the first blades and having their cutting edges directed forwardly and disposed in advance of the forward edges of the adjacent beam supporting portions.

ROBERT W. BRIGGS.